Aug. 8, 1967 D. J. DAVIS 3,334,762
BALE GRAB AND HOIST APPARATUS
Filed May 19, 1964 3 Sheets-Sheet 1

Aug. 8, 1967 D. J. DAVIS 3,334,762
BALE GRAB AND HOIST APPARATUS
Filed May 19, 1964 3 Sheets-Sheet 2

United States Patent Office 3,334,762
Patented Aug. 8, 1967

3,334,762
BALE GRAB AND HOIST APPARATUS
Dennis John Davis, 90 Aotea St., Mission Bay,
Auckland, North Island, New Zealand
Filed May 19, 1964, Ser. No. 368,596
14 Claims. (Cl. 214—730)

This invention relates to apparatus used for the handling of bales of wool and particularly in wool stores wherein bales of wool are transported, stacked and sometimes frequently moved about from position to position between the time of entry to the store and final removal therefrom, with the objects of the present invention being the provision of an improved apparatus used for the transporting and elevating of bales which will greatly speed up the operations.

In the handling of bales of wool in wool stores, fork lift trucks present the most suitable and convenient form of elevating and transporting apparatus, there being the trucks with forks on which the bales rest and other trucks with opposite side clamps which close against opposite sides of a bale to grip same.

With a bale resting on the forks and elevated to be deposited on to a high stack of bales, there can be difficulty in the withdrawal of the forks from under the bale and with the side clamp form of apparatus there has to be a space at the sides of the bale into which the side clamps can move away from the bale in order to be drawn outwardly and therefore while fork lift trucks and the like are of great assistance in the handling of bales of wool, several men are required to work in conjunction with the driver of the truck.

The present invention has therefore been devised to not only have the present benefits of fork lift trucks, but to give some additional benefits not capable of achievement by the present known apparatus.

According to one aspect of the invention the improved bale grab and hoist apparatus comprises a mobile chassis, a bale grab component carried on the chassis and capable of being raised and lowered on the chassis under hydraulic action, and a hydraulic unit capable of actuating the grab component to engage the grab component in bales for lifting and transporting of the bales.

According to a second aspect of the invention, the improved bale grab and hoist apparatus comprises a mobile chassis, a bale grab component consisting of opposed sets of hooks and carried on the mobile chassis, the bale grab component being capable of being raised and lowered on the chassis under the action of a hydraulic ram and cylinder unit, and a second hydraulic ram and cylinder unit capable of actuating the bale grab component to engage the hooks in bales or the like for lifting and transporting of the bales.

According to a third aspect of the invention, the improved bale grab and hoist apparatus comprises a mobile chassis, a frame carried on the mobile chassis, the frame supporting at least one bale grab component capable of being raised or lowered under hydraulic action, the bale grab component including sets of opposed hooks capable of being actuated under hydraulic action to move the sets of hooks inwardly of the bale grab component to engage a bale or bales for lifting and transporting purposes.

The invention will now be described with the aid of the accompanying drawings in which.

Figure 1:
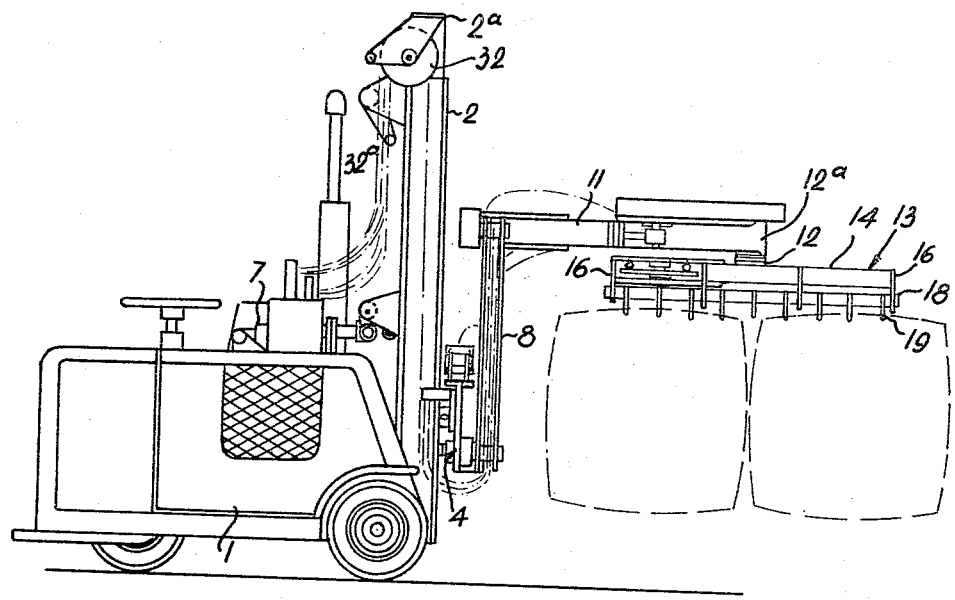
FIG. 1 is a view in side elevation of one form of the invention.
Figure 3:
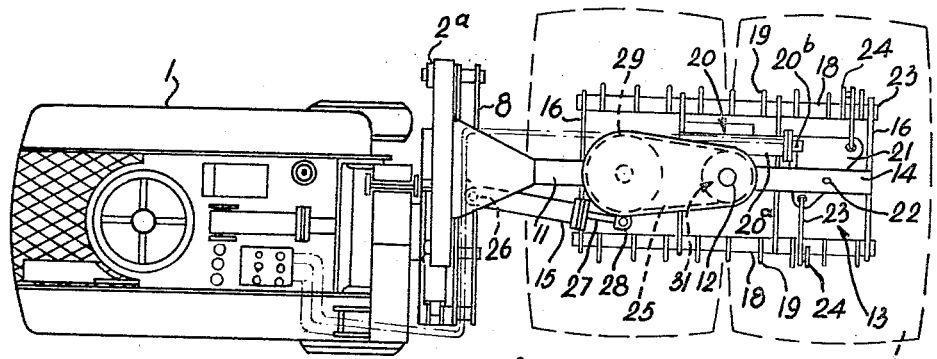
FIG. 3 is a plan view of FIG. 1.
Figure 4:
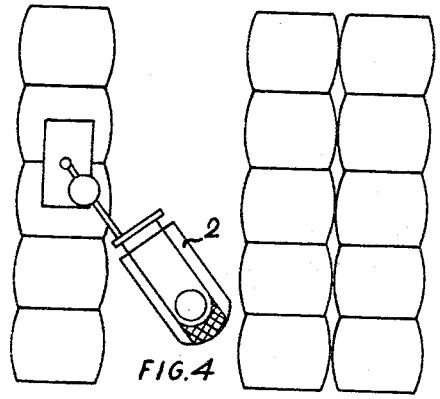
FIG. 4 is a schematic view of the bale grab and hoist apparatus as illustrated in FIG. 1, being operated to lift bales from a stack.
Figure 2:
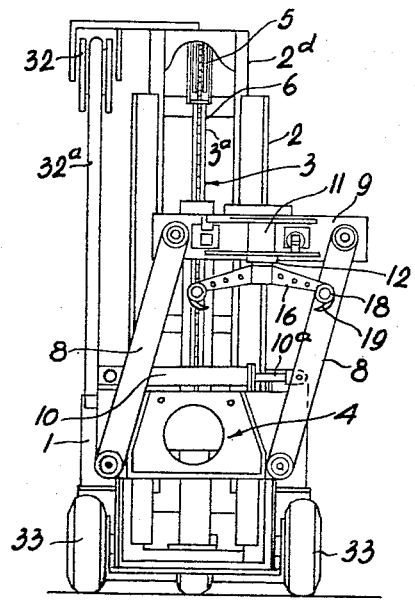
FIG. 2 is a view in front elevation of FIG. 1.

Referring now to the drawings and with particular reference to FIGS. 1, 2 and 3 the mobile chassis 1 is of a conventional known truck or forklift type chassis and provided with an upwardly extending mast 2 pivotally mounted on the chassis 1 within which is mounted a hydraulic ram and cylinder unit 3 (see FIG. 2). The hydraulic ram and cylinder unit 3 is vertically disposed within the mast 2 and a slidable extension 2a of the mast 2 is secured to the upper or free end of the ram 3a of the ram and cylinder unit 3.

A cross or base plate serving as the support for the bale grab apparatus is generally indicated as at 4 and is slidable on the mast 2 under the action of the ram and cylinder unit. More specifically the connection between the ram and cylinder unit and the base plate 4 is provided by means of sprocket wheel 5 rotatably carried on the upper end of the ram 3a and a chain 6 anchored to the base plate 4 and passed upwardly and over the sprocket wheel 5 and anchored to the mast 2. The arrangement is such that by projecting the ram 3a of the unit 3, the base plate 4 is raised through the connection of the chain 6 and sprocket wheel 5.

As shown in FIGS. 1 and 2 the mast 2 which as previously mentioned, is pivotally mounted on the chassis 1, can be tilted to a limited degree by means of a hydraulic ram and cylinder unit 7.

The base plate 4 is slidable on the mast 2 and serves as the base for the mounting of the grab component of the improved bale grab and hoist apparatus as will now be described.

In a preferred form of the invention and as illustrated in FIGS. 1, 2 and 3 of the drawings, the bale grab and hoist apparatus includes a sideshift means or means for laterally moving the grab apparatus relative to the mast 2 to provide for final adjustment in the depositing of bales when the apparatus is being operated in a position with the chassis 1 not directly aligned with a stack of bales.

More particularly the base plate 4 carries two pivotally mounted arms 8 which extend upwardly from each end of the base plate 4. The upper ends of the arms 8 are each pivotally connected to an upper cross bar 9 (see FIG. 2), so that the base plate 4, arms 8 and cross bar 9 form a frame of parallelogram formation which is operated by a hydraulic ram and cylinder unit 10. More specifically and as illustrated in FIG. 2 the hydraulic ram and cylinder unit 10 is pivotally mounted horizontally on the base plate 4 with the free end of the ram 10a pivotally connected to one of the arms 8 so that projection or retraction of the ram moves the parallelogram frame laterally by pivoting the side arms 8 on the pivot mountings (see FIG. 2).

As illustrated in the drawings the upper cross bar 9 of the parallelogram frame carries a main beam 11 projecting horizontally and forwardly therefrom. The main beam 11 is suitably secured and stayed to the cross bar 9 and at the front end thereof carries in pivotal engagement with a vertically disposed pivot pin 12 pivotally supported in a bearing 12a on the beam 11 and which serves as the turnable support for the bale grab component generally indicated as at 13 and which is disposed thereunder. The pivot pin 12 is rigidly secured to a central and horizontally disposed main bar 14 which forms the central and main support of a bale grab component 13 which supports the actual grabbing devices of the apparatus as will now be described. The frame of the bale grab is of rectangular formation (see FIG. 3), and horizontally disosed and includes the main and central bar 14 and a number of spaced apart arms 16 secured to and extending across the central bar 14 at right angles thereto. The outer or free ends of the arms 16 support, in rotatable engagement, a shaft 18 carrying sets of hooks 19 or claws rigidly secured to each shaft 18.

Figure 8:
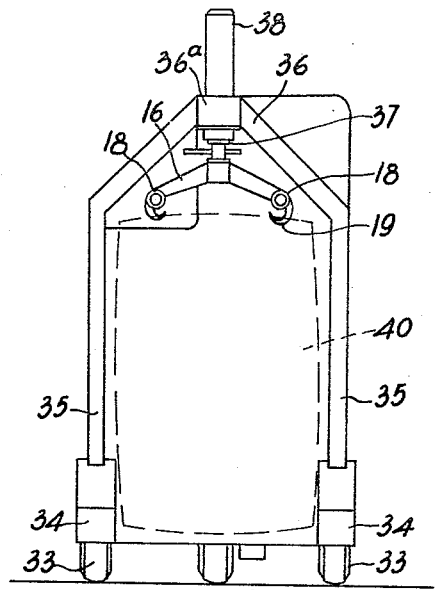
FIG. 8 is a view in front elevation of FIG. 7.

To particularize further on this aspect of the invention the shafts 18 are parallel (see FIG. 3) and the hooks 19 are of curved formation and positioned so that when the shafts 18 are partially rotated the curved hooks 19 are swung inwardly and upwardly to engage in the sacking of a bale or the like (see FIG. 8). Conversely when the shafts 18 are moved in the opposite direction the hooks 19 disengage from the bale. Movement of the hooks 19 is controlled by a hydraulic ram and cylinder unit generally indicated as at 20 mounted on the main bar 14. More specifically and as shown in FIG. 3, the cylinder 20a of the unit is mounted on the bar 14 and the free end of the piston rod 20b of the unit is pivotally connected to the apex of a triangular plate 21 pivotally mounted as at 22 on the main bar 14. The outer ends of the triangular plate 21 are each connected by means of swivel connections to connecting rods 23, the outer ends of which are pivotally connected to lugs 24 extending outwardly from each rotatable shaft 18. By means of such an arrangement, upon the piston rod 20b being extended, the triangular plate 21 is rotated on its pivot point 22 to draw the corners of the plate 21 and the connecting rods 23 inwardly to rotate the rotatable shafts 18 and raise the hooks 19. When the piston rod 20b is retracted the plate 21 and connecting rods 23 are moved in the opposite direction to rotate or partly rotate the shafts 18 in the opposed direction to move the two sets of hooks 19 inwardly towards each other for engagement in a bale or the like.

As illustrated in the drawings, in addition to the power operated actuation of the hooks 19 of the bale grab component, the bale grab component as a whole is rotatable or partially rotatable on the main pivot pin 12 under the action of a hydraulic ram and cylinder unit 15 in combination with a gear chain and sprocket drive 25. More particularly the free end of the cylinder of the ram and cylinder unit 15 is pivotally connected as at 26 to the main beam 11 while the free end of the ram 27 thereof, is pivotally connected to a lug 28 extending from a sprocket wheel 29 horizontally and pivotally mounted on the upper surface of the main beam 11. A chain 25 leads about the sprocket wheel 29 and about a further smaller sprocket wheel 31 secured to the main pivot pin 12. The arrangement is such that when hydraulic fluid is forced into the cylinder 15 of the hydraulic ram and cylinder unit the ram 27 thereof is projected to rotate or partially rotate the larger sprocket wheel 29 which in turn moves the chain 25 and smaller sprocket wheel 31 and pivot pin 12 to rotate or partially rotate the bale grab component 13 for bale stacking purposes.

As illustrated in FIGS. 1 and 2 of the drawings the apparatus carries a drum hose guide 32 rotatably mounted on the mast 2 on which the flexible supply lines 32a leading to and from the hydraulic ram and cylinder unit are carried.

In the form of the invention illustrated in FIGS. 5, 6, 7 and 8 the apparatus is provided in a form for the transportation of bales of wool or the like about, for instance, a wool store. As shown in the drawings, the apparatus comprises a mobile chassis 1 including a frame extending forwardly from the chassis and supported on forward ground wheels 33. More specifically the frame consists of two lower longitudinal beams 34 extending forwardly from the chassis 1 and on which the wheels are rotatably mounted, and vertical posts 35 extending upwardly from each beam 34, the upper ends of which are joined by an overhead arch-like crosspiece 36, connected to a beam 36a extending forwardly from the chassis.

From the aforegoing description it will be understood that the forward end of the frame as described, is open, the frame being intended to be passed over a number of bales to the latter to be lifted by the apparatus as will now be described.

Figure 7:
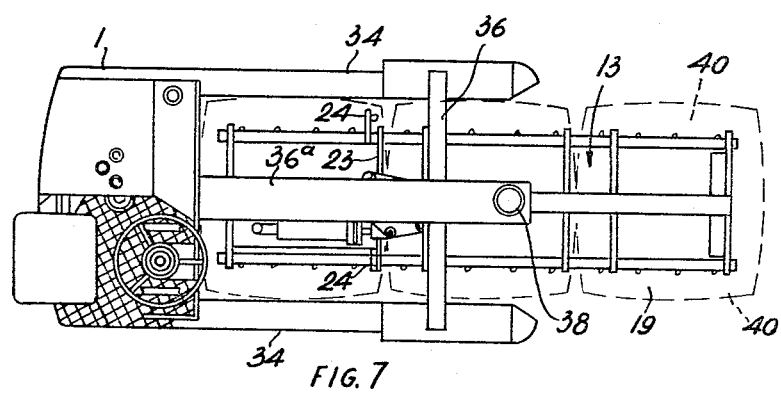
FIG. 7 is a plan view of a further form of the invention.

As illustrated in FIGS. 7 and 8 the frame is of a size to accommodate a row of three bales. The overhead crosspiece 36 serves to support a bale grab component frame 13 as previously described for the lifting of bales. More specifically the bale grab component 13 is mounted longitudinally under the overhead crosspiece 36 and is attached to the free end of a ram 37 of an inverted and vertically mounted ram and cylinder unit 38 mounted in an inverted position in the overhead crosspiece 36 which in turn is supported from the beam 36a.

Figure 5:
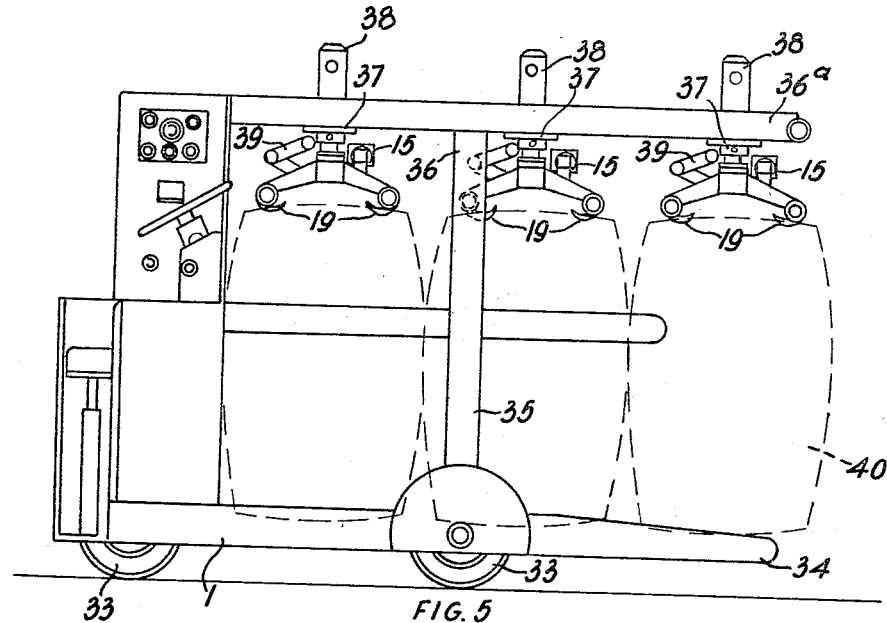
FIG. 5 is a view in side elevation of a second form of the invention.

As shown in FIG. 5 the bale grab component 13 is braced from the beam 36a by parallel linkage 39 to maintain the bale grab component 13 (see FIG. 5) in alignment during operation. The parallel linkage 39 consists of a set of two links pivotally joined together between the beam 36a and the bale grab component 13.

In operation the ram 37 of the ram and cylinder unit is operated vertically to raise or lower the bale grab component 13. For instance to lift three bales 40, the apparatus is moved to a position whereby the lower beams 34 are passed to each side of the row of bales and the bale grab component 13 is poised directly over the tops of the bales 40. The bale grab component 13 is then lowered by means of the ram 37 and the shafts 18 partially rotated as previously described so that the hooks 19 move inwardly and downwardly and upwardly to grip into the top surfaces of the bales 40. The ram 37 is then raised to lift the bale grab component 13 and the bales 40 in readiness for the bales to be transported by the apparatus.

Figure 6:
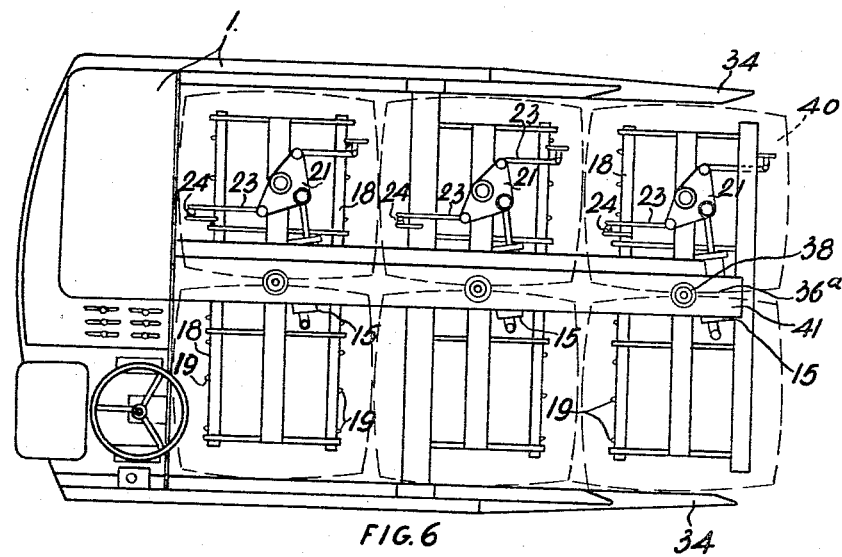
FIG. 6 is a plan view of FIG. 5.

FIGS. 5 and 6 of the drawings illustrate a further form of transporter of substantially the same construction as the transporter illustrated in FIGS. 7 and 8 except in this instance provision is made for the transportation of six bales at a time. More specifically three bale grab components 13 are provided mounted crosswise in the frame which includes a central beam 41 on which the bale grab components 13 are raised or lowered by means of ram and cylinder units 38 as previously described. In a like manner the shafts 18 are rotatable under the action of the ram and cylinder units 20 to engage the hooks 19 in the bales 40 as has previously been described.

What I do claim and desire to obtain by Letters Patent of the United States of America is:

1. A bale grab and hoist apparatus comprising a mobile chassis, a bale grab means mounted on the chassis for upward and downward movement, a cylinder and piston unit operably connected to the bale grab means for effecting said upward and downward movement, said bale grab means including a pair of spaced apart parallel shafts mounted for rotation relative to said chassis, axially spaced hooks on each shaft, a second cylinder and piston unit carried by said chassis, linkage means interconnecting said second piston and cylinder unit whereby movement of the piston in one direction turns the shafts to move the hooks toward each other for engaging a bale while movement of the piston in the opposite direction turns the shafts to move the hooks away from each other for disengaging a bale, said linkage means including a pivotally mounted triangular plate, the piston of the second cylinder and piston unit being pivotally connected to the apex of the triangular plate and connecting rods pivotally connected to the other corners of the plate and shafts, respectively.

2. A bale grab and hoist apparatus as claimed in claim 1 wherein the chassis supports a mast, a sub-frame movable on the mast and a vertically operated ram and cylinder unit for moving said sub-frame, with the sub-frame carrying the bale grab means.

3. A bale grab and hoist apparatus as claimed in claim 2 and wherein the sub-frame includes means enabling the bale grab means to be adjusted laterally.

4. A bale grab and hoist apparatus as claimed in claim 3 and wherein the means enabling the bale grab means to be adjusted laterally comprises a frame of parallelogram formation consisting of a stationary base plate, two vertically extending arms pivotally connected to the base plate, and a cross bar pivotally connected between upper ends of the side arms, with the said cross bar carrying the bale grab means.

5. A bale grab and hoist apparatus as claimed in claim 4 and wherein the parallelogram frame is moved laterally under the action of a hydraulic piston and cylinder unit, the piston of which is pivotally connected to one side arm of the said frame.

6. A bale grab and hoist apparatus as claimed in claim 4 and wherein the bale grab means is supported on a main beam extending forwardly from the base plate.

7. A bale grab and hoist apparatus as claimed in claim 6 and wherein the bale grab means is pivotally suspended from the main beam and is partially rotatable under the action of a hydraulic piston and cylinder unit and sprocket wheels and chain.

8. A bale grab and hoist apparatus as claimed in claim 7 and wherein the pivotal mounting of the bale grab means is a pin extending upwardly from the bale grab means and pivotally retained in the main beam, one of the sprocket wheels being mounted on the pin and the other and larger sprocket wheel being pivotally mounted on the beam and pivotally connected to the ram of the hydraulic piston and cylinder unit, and a chain passed about the two sprocket wheels.

9. A bale grab and hoist apparatus as claimed in claim 1 and wherein a bifurcated frame supported on ground wheels extends forwardly from the chassis, and the bale grab means is adjustably supported over the bifurcated frame.

10. A bale grab and hoist apparatus as claimed in claim 9 and wherein the frame includes an overhead arch-like crosspiece supported from a central beam of the frame, the overhead arch-like crosspiece supporting a vertically positioned cylinder and piston unit, the piston of which is connected to the bale grab means.

11. A bale grab and hoist apparatus as claimed in claim 10 and wherein the cylinder and piston unit is inverted and the outer end of the piston is fixed to the bale grab means.

12. A bale grab and hoist apparatus as claimed in claim 9 and wherein the bifurcated frame includes two lower longitudinal beams extending forwardly from the chassis, vertical posts extending upwardly from each beam and at least one overhead archlike crosspiece supported from a beam extending forwardly from the chassis.

13. A bale grab and hoist apparatus as claimed in claim 12 and wherein one bale grab means is positioned above and between the bifurcations of the frame and aligned with the bifurcations.

14. A bale grab and hoist apparatus as claimed in claim 9 and wherein a plurality of bale grab means are positioned crosswise between the bifurcations of the frame.

References Cited

UNITED STATES PATENTS

| | | | |
|---|---|---|---|
| 2,812,070 | 11/1957 | Delzer | 214—658 X |
| 3,048,288 | 8/1962 | Dwyer | 214—147 |

FOREIGN PATENTS

| | | |
|---|---|---|
| 1,267,534 | 6/1961 | France. |

GERALD M. FORLENZA, *Primary Examiner.*

R. B. JOHNSON, *Assitant Examiner.*